US009826154B2

(12) United States Patent
Naito et al.

(10) Patent No.: US 9,826,154 B2
(45) Date of Patent: *Nov. 21, 2017

(54) IMAGING DEVICE, CONTROL METHOD OF IMAGING DEVICE, AND COMPUTER PROGRAM

(71) Applicant: Sony Corporation, Tokyo (JP)

(72) Inventors: Masaki Naito, Tokyo (JP); Tsukasa Kirisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,014

(22) Filed: Jul. 19, 2016

(65) Prior Publication Data

US 2017/0013196 A1    Jan. 12, 2017

Related U.S. Application Data

(63) Continuation of application No. 14/638,404, filed on Mar. 4, 2015, now Pat. No. 9,423,670, which is a
(Continued)

(30) Foreign Application Priority Data

Jun. 5, 2012   (JP) ................. 2012-127793

(51) Int. Cl.
*H04N 5/232*     (2006.01)
*H04N 5/225*     (2006.01)
(Continued)

(52) U.S. Cl.
CPC ........... *H04N 5/23245* (2013.01); *G03B 9/64* (2013.01); *G03B 13/36* (2013.01); *G03B 17/40* (2013.01);
(Continued)

(58) Field of Classification Search
CPC ................................................ H04N 5/23212
See application file for complete search history.

(56) References Cited

U.S. PATENT DOCUMENTS

| 2008/0122943 A1 | 5/2008 | Itoh |
| 2013/0050556 A1 | 2/2013 | Lee et al. |

FOREIGN PATENT DOCUMENTS

| JP | H01-69217 U | 5/1989 |
| JP | 02-105124 A | 4/1990 |

(Continued)

OTHER PUBLICATIONS

Japanese Office Action dated Jun. 7, 2016 for corresponding Japanese Application No. 2012-127793.
(Continued)

*Primary Examiner* — Paul Berardesca
(74) *Attorney, Agent, or Firm* — Michael Best & Friedrich LLP

(57) ABSTRACT

There is provided an imaging device including an imaging control unit that executes imaging control in first and second self-timer modes in which an automatic focusing process and an imaging process are executed in order after reception of an imaging start instruction. A first period from the reception of the imaging start instruction to execution of the automatic focusing process in the first self-timer mode is shorter than a second period from the reception of the imaging start instruction to execution of the automatic focusing process in the second self-timer mode.

21 Claims, 6 Drawing Sheets

Related U.S. Application Data continuation of application No. 13/863,464, filed on Apr. 16, 2013, now Pat. No. 9,007,511.

(51) Int. Cl.
  *G03B 9/64* (2006.01)
  *G03B 17/40* (2006.01)
  *G03B 13/36* (2006.01)

(52) U.S. Cl.
  CPC ......... *H04N 5/2251* (2013.01); *H04N 5/2252* (2013.01); *H04N 5/23212* (2013.01); *H04N 5/23216* (2013.01); *H04N 5/23293* (2013.01)

(56) References Cited

FOREIGN PATENT DOCUMENTS

| | | |
|---|---|---|
| JP | H05-173055 A | 7/1993 |
| JP | H10-293342 A | 11/1998 |
| JP | 2000-032303 A | 1/2000 |
| JP | 2005-134847 A | 5/2005 |
| JP | 2005-192093 A | 7/2005 |
| JP | 2005-234480 A | 9/2005 |
| JP | 2005-277907 A | 10/2005 |
| JP | 2005-303728 A | 10/2005 |
| JP | 2008-136035 A | 6/2008 |
| JP | 2010-160217 A | 7/2010 |

OTHER PUBLICATIONS

Chinese Office Action issued Jun. 12, 2017 for corresponding Chinese Application No. 201310206621.0.

IMAGING DEVICE, CONTROL METHOD OF IMAGING DEVICE, AND COMPUTER PROGRAM

CROSS REFERENCE TO RELATED APPLICATIONS

This application is a Continuation application of application Ser. No. 14/638,404, filed Mar. 4, 2015 which is a Continuation application of U.S. patent application Ser. No. 13/863,464, filed Apr. 16, 2013, and issued as U.S. Pat. No. 9,007,511 on Apr. 14, 2015, which in turn claims priority from Japanese Priority Patent Application JP 2012-127793 filed in the Japan Patent Office on Jun. 5, 2012, the entire content of which is hereby incorporated by reference.

BACKGROUND

The present disclosure relates to an imaging device, a control method of the imaging device, and a computer program.

Silver halide cameras and digital cameras that can obtain image data by imaging still images are generally provided with a self-timer imaging mode in which imaging is performed after a fixed time elapses from a release operation of a shutter button so that the photographer can be included in an imaging frame as a subject (refer to Japanese Unexamined Patent Application Publication No. H02-105124 and 2005-277907).

SUMMARY

In recent years, there have been digital cameras with a pivoting display that displays a setting screen thereon, or displays a so-called live view image or a captured image. Among such digital cameras, there are those that can image the reflection of a photographer himself/herself with ease by setting a display plane of a display thereof to face the same orientation of that of a lens. In addition, in recent years, there have been cameras in which a trigger to start imaging is set to a contact operation by a photographer with a display, in addition to a shutter releasing operation.

General digital cameras perform an automatic focusing process on a subject when a photographer performs an imaging operation in a general imaging mode, not in a self-timer imaging mode. In addition, in the self-timer imaging mode, a digital camera actually executes an imaging process after a predetermined time elapses. However, when the automatic focusing process is executed at the same time at which a photographer performs an imaging operation using a button to start a self-timer in the self-timer imaging mode in a digital camera with a pivoting display, a focusing process that is not intended by the photographer, such as focusing on a hand or an arm of the photographer is executed.

Therefore, it is desirable for the present disclosure to provide a novel and improved imaging device, control method of the imaging device, and computer program that can appropriately execute self-timer imaging, avoiding a focusing process that is not intended by a photographer.

According to an embodiment of the present disclosure, there is provided an imaging device including an imaging control unit that executes imaging control in first and second self-timer modes in which an automatic focusing process and an imaging process are executed in order after reception of an imaging start instruction. A first period from the reception of the imaging start instruction to execution of the automatic focusing process in the first self-timer mode is shorter than a second period from the reception of the imaging start instruction to execution of the automatic focusing process in the second self-timer mode.

According to an embodiment of the present disclosure, there is provided a method of controlling an imaging device, the method including controlling imaging in first and second self-timer modes in which an automatic focusing process and an imaging process are executed in order after reception of an imaging start instruction. A first period from the reception of the imaging start instruction to execution of the automatic focusing process in the first self-timer mode is shorter than a second period from the reception of the imaging start instruction to execution of the automatic focusing process in the second self-timer mode.

According to an embodiment of the present disclosure, there is provided a computer program for causing a computer to execute controlling imaging in first and second self-timer modes in which an automatic focusing process and an imaging process are executed in order after reception of an imaging start instruction. A first period from the reception of the imaging start instruction to execution of the automatic focusing process in the first self-timer mode is shorter than a second period from the reception of the imaging start instruction to execution of the automatic focusing process in the second self-timer mode.

According to the embodiments of the present disclosure described above, a novel and improved imaging device, control method of the imaging device, and computer program that can appropriately execute self-timer imaging, avoiding a focusing process that is not intended by a photographer can be provided.

DETAILED DESCRIPTION OF THE EMBODIMENT

Figure 1:
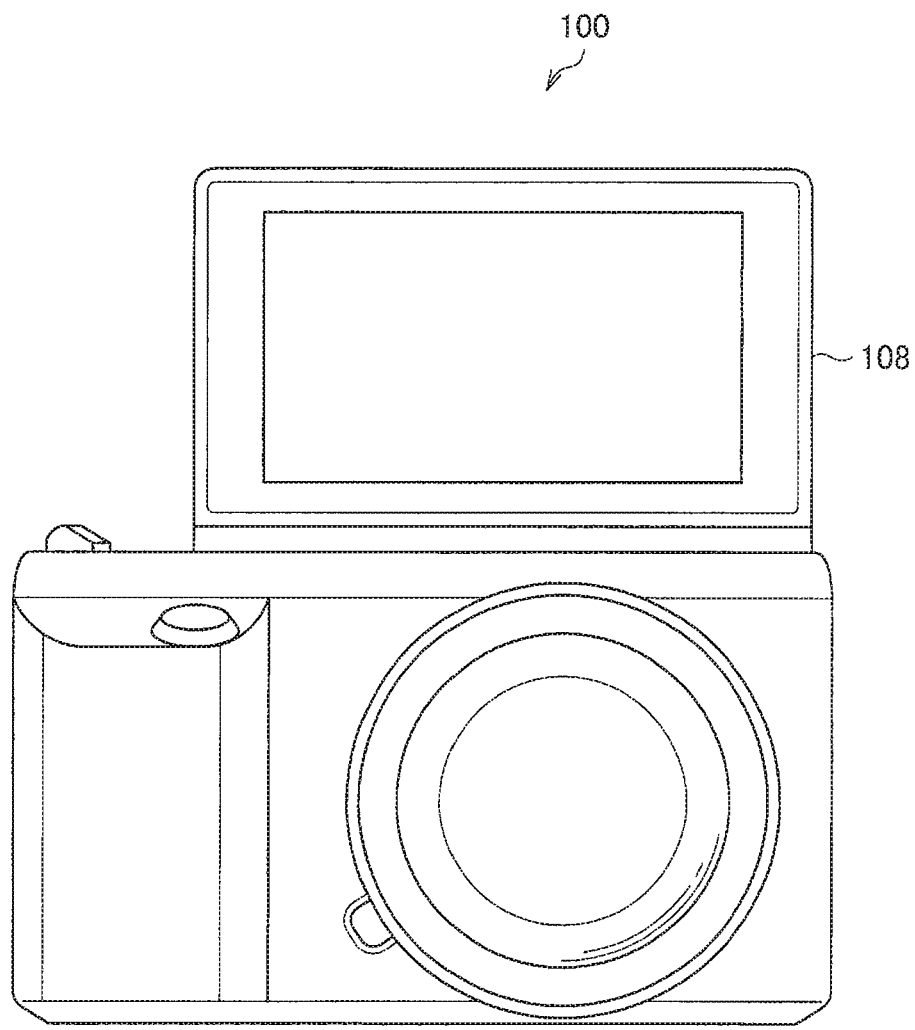
FIG. 1 is an illustrative diagram showing the appearance of an imaging device 100 according to an embodiment of the present disclosure in a front view.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

<1. Embodiment of the Present Disclosure>
[Appearance Example of Imaging Device]
[Functional Configuration Example of Imaging Device]
[Operation Example of Imaging Device]
<2. Conclusion>

<1. Embodiment of the Present Disclosure>
[Appearance Example of Imaging Device]

Figure 2:
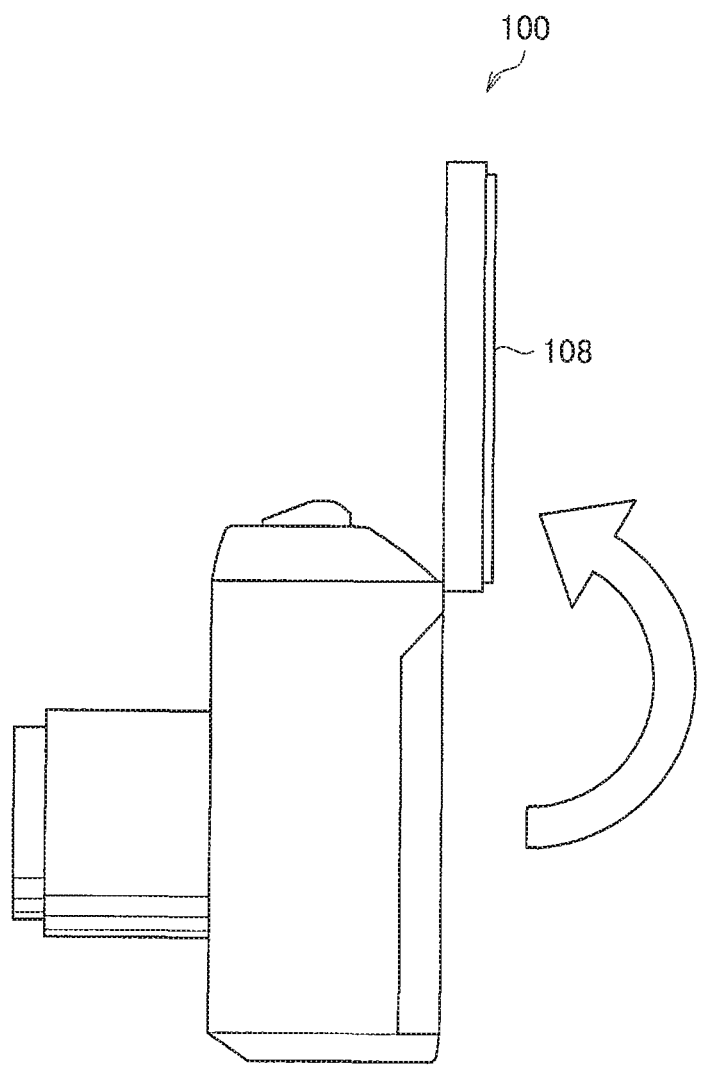
FIG. 2 is an illustrative diagram showing the appearance of the imaging device 100 according to the embodiment of the present disclosure in a side view.

First, an appearance example of an imaging device 100 according to an embodiment of the present disclosure will be described. FIG. 1 is an illustrative diagram showing the appearance of the imaging device 100 according to an embodiment of the present disclosure in a front view, and FIG. 2 is an illustrative diagram showing the appearance of the imaging device 100 according to the embodiment of the present disclosure in a side view. Hereinafter, the appearance example of the imaging device according to the embodiment of the present disclosure will be described using FIGS. 1 and 2.

As shown in FIGS. 1 and 2, the imaging device 100 according to the embodiment of the present disclosure is provided with a display unit 108 that is pivotably rotated and displays a setting screen thereon, or displays a so-called live view image for ascertaining a composition before imaging or a captured image. FIGS. 1 and 2 show the imaging device 100 of which the display unit 108 pivots 180 degrees having the side on the upper portion of the imaging device as a pivot. Of course, it is needless to say that the pivoting form of the display unit 108 is not limited to the example above.

Figure 3:
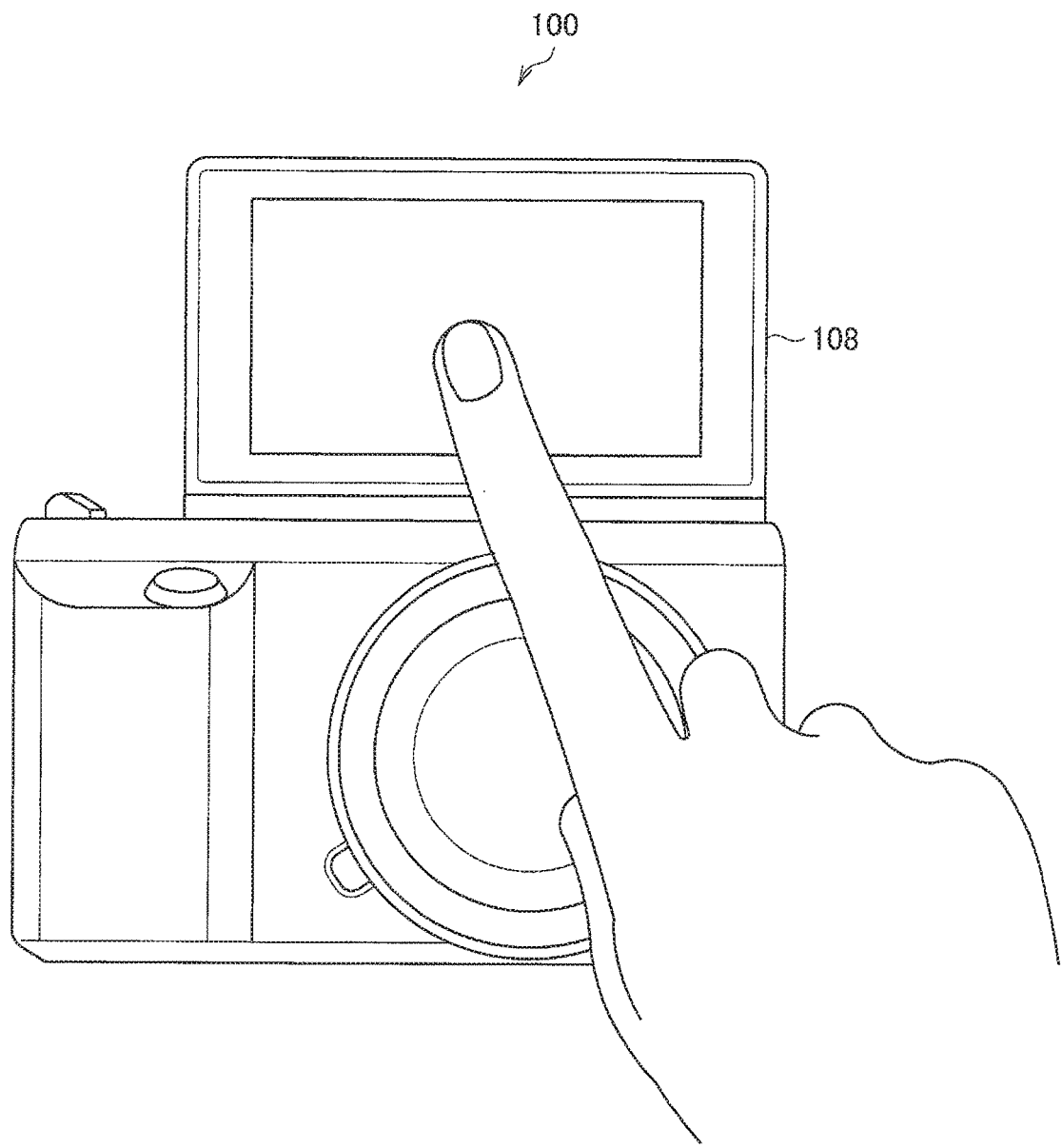
FIG. 3 is an illustrative diagram showing the state in which a photographer brings his or her finger into contact with a display unit 108.

The imaging device 100 according to the present embodiment is provided with a touch panel in the display unit 108, and also starts an imaging operation by a contact of a his or her finger with the display unit 108, in addition to depressing a shutter button. FIG. 3 is an illustrative diagram showing the state in which a photographer brings his or her finger into contact with the display unit 108 in the state in which the display unit 108 has pivoted 180 degrees. Note that FIG. 3 shows the state in which the index finger of the right hand of the photographer comes into contact with the display unit 108, and the left hand of the photographer is not shown. As shown in FIG. 3, when the finger of the photographer is brought into contact with the display unit 108, his or her hand is positioned before a lens that is provided in the housing of the imaging device 100 to guide light from a subject to an imaging element. In other words, when the photographer brings his or her finger into contact with the display unit 108, the imaging device 100 is in the state in which light is incident on the lens provided in the front face of the housing of the imaging device 100 is blocked by the hand of the photographer. If an imaging operation is started in this state, the focus is placed on the hand of the photographer.

Therefore, when the photographer attempts to execute self-timer imaging using the imaging device 100, if he or she brings his or her finger into contact with the display unit 108 in the state in which the display unit 108 has pivoted 180 degrees as shown in FIGS. 1 and 2 to view his or her reflection on the display unit 108, the self-timer imaging is executed while his or her hand is focused.

Thus, in the embodiment to be described below, an imaging device that appropriately executes self-timer imaging, avoiding a focusing process that is not intended by a photographer when the self-timer imaging is attempted to be executed using the imaging device 100 will be described.

Hereinabove, the appearance example of the imaging device according to the embodiment of the present disclosure has been described. Next, a functional configuration example of the imaging device 100 according to the embodiment of the present disclosure will be described.

[Functional Configuration Example of Imaging Device]

Figure 4:
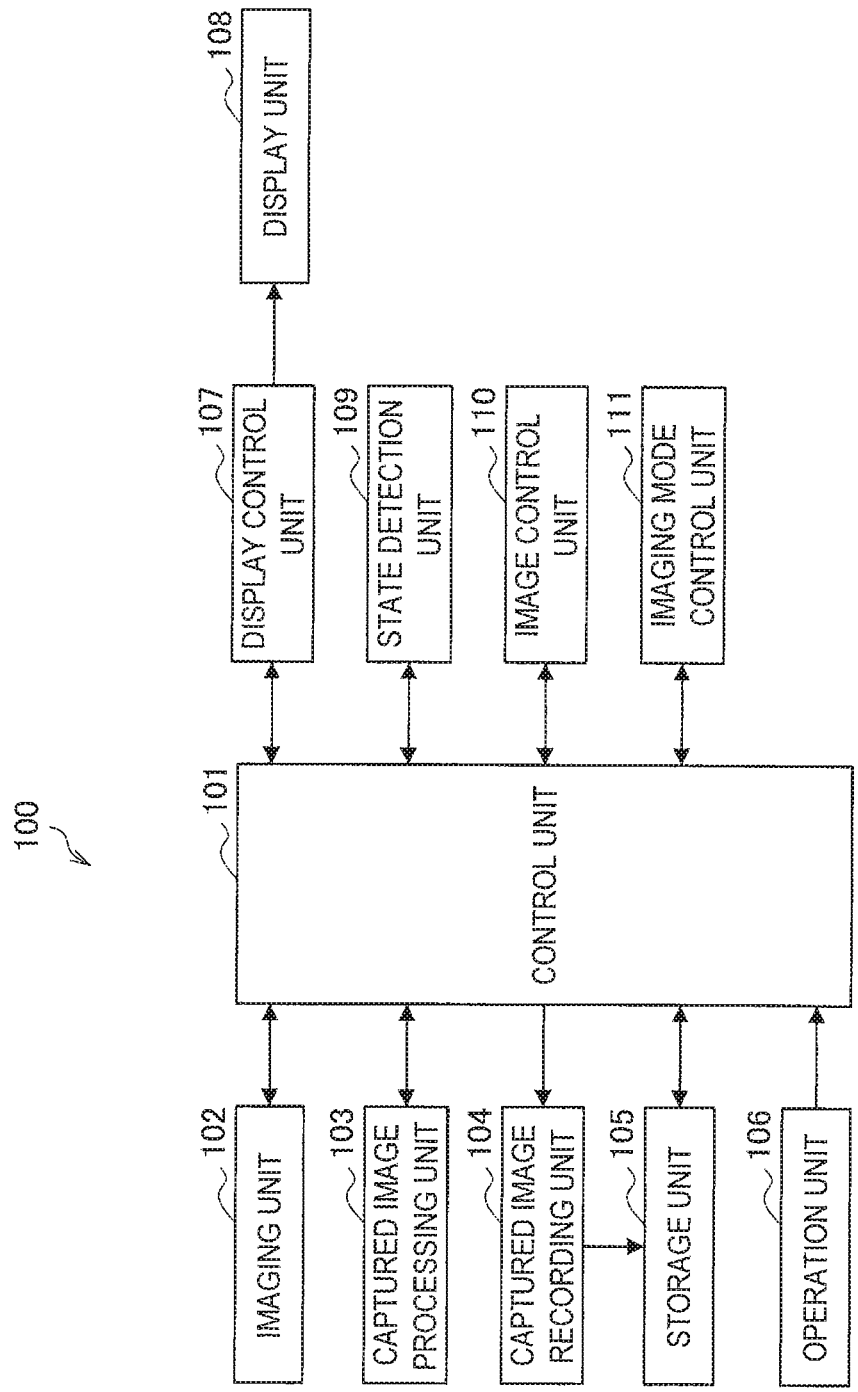
FIG. 4 is a descriptive diagram showing a functional configuration example of the imaging device 100 according to the embodiment of the present disclosure.

FIG. 4 is a descriptive diagram showing a functional configuration example of the imaging device 100 according to the embodiment of the present disclosure. Hereinafter, the functional configuration example of the imaging device 100 according to the embodiment of the present disclosure will be described using FIG. 4.

As shown in FIG. 4, the imaging device 100 according to the embodiment of the present disclosure is configured to include a control unit 101, an imaging unit 102, a captured image processing unit 103, a captured image recording unit 104, a storage unit 105, an operation unit 106, a display control unit 107, a display unit 108, a state detection unit 109, an image control unit 110, and an imaging mode control unit 111.

The control unit 101 controls operations of each unit of the imaging device 100. The control unit 101 includes, for example, a CPU (Central Processing Unit). The control unit 101 may control the operations of each unit of the imaging device 100 by reading and sequentially executing computer programs recorded in a recording medium, for example, a ROM (Read Only Memory) provided in the imaging device 100.

The imaging unit 102 images a subject to generate an image signal. The imaging unit 102 includes an imaging element that converts light into electric signals in photoelectric conversion, a zoom lens and a focus lens that guide light from subjects to the imaging element, a diaphragm that adjusts brightness of subjects, a shutter that controls light incidence on the imaging element, and the like. Image signals generated by the imaging unit 102 are transferred to the captured image processing unit 103 by the control of the control unit 101.

The captured image processing unit 103 performs a predetermined signal process on image signals generated by the imaging unit 102. The signal process executed by the captured image processing unit 103 includes, for example, a noise reduction process, an image quality improving process, and the like. An image signal for which the captured image processing unit 103 performs such a predetermined signal process is transferred to the captured image recording unit 104 by the control of the control unit 101.

The captured image recording unit 104 compresses the image signal for which the captured image processing unit 103 performs the signal process using a compression coding scheme to record the signal on the storage unit 105 as image data. The storage unit 105 stores data regarding various processes of the imaging device 100. The storage unit 105 includes, for example, a ROM, a RAM, a memory, card, and the like. The storage unit 105 stores, for example, computer programs executed by the control unit 101, various kinds of setting information for controlling operations of each unit of the imaging device 100 by the control unit 101, and image data generated by the captured image recording unit 104.

The operation unit 106 functions as a user interface to operate the imaging device 100. The operation unit 106 includes, for example, various operation buttons such as a shutter button, a cross button, and a menu button provided on an exterior of the imaging device 100, a touch panel or a remote controller. The operation unit 106 outputs operation signals according to operations of a user to the control unit 101. The control unit 101 executes various operations based on the operation signals transferred from the operation unit 106.

The display control unit 107 executes display control to display various kinds of information such as text, images, and other information on the display unit 108 based on the control of the control unit 101. The display unit 108 displays various kinds of information such as text, images, and other information which is controlled by the display control unit 107 to be displayed. The display unit 108 includes, for example, an LCD (Liquid Crystal Display), an organic EL (Electro-Luminescence) display, and the like.

In the present embodiment, a touch panel is provided on the surface of a display plane of the display unit 108. A user can operate the imaging device 100 by bringing his or her finger into contact with the display unit 108 on which the touch panel is provided. Thus, the display unit 108 is an example of the operation unit of the present disclosure. Operational functions of the imaging device 100 available by bringing a finger into contact with the display unit 108 include, for example, a focusing function of a subject displayed on the display unit 108 as a live view, an imaging start instructing function for instructing the control unit 101 to start imaging, and a selecting function on the menu screen displayed on the display unit 108.

The state detection unit 109 detects states of the imaging device 100. The state detection unit 109 detects pivoting states of the display unit 108 as detection of a state of the imaging device 100. On top of that, the state detection unit 109 detects holding or non-holding of the imaging device 100 by a user, a fixed state of the imaging device 100, or the like as detection of a state of the imaging device 100. When the state detection unit 109 detects holding or non-holding of the imaging device 100 by a user, the detection may be performed based on the presence or absence of a signal from a capacitance sensor, a pressure sensor, or another sensor that detects holding by a user provided at a predetermined position of the housing of the imaging device 100. In addition, in order to detect a fixed state of the imaging device 100 as detection of a state of the imaging device 100, the state detection unit 109 may have a gyro sensor, or an acceleration sensor.

The imaging device 100 according to the present embodiment changes the operation of the automatic focusing process during self-timer imaging according to states of the imaging device 100 after the state detection unit 109 detects the states of the imaging device 100. More specifically, the imaging device 100 according to the present embodiment changes the operation of the automatic focusing process during self-timer imaging based on whether the display plane of the display unit 108 faces the back side of the imaging device 100 or the front side thereof after the state detection unit 109 detects a pivoting state of the display unit 108. The imaging device 100 according to the present embodiment can appropriately execute self-timer imaging avoiding a focusing process that is not intended by a photographer. Note that the front side of the imaging device 100 refers to a side that the lens in the imaging unit 102 faces and the back side of the imaging device 100 refers to the side opposite to the side that the lens in the imaging unit 102 faces.

The image control unit 110 execute various kinds of control for image data that the imaging unit 102 images. The image control unit 110 executes, for example, a face detection process in which a face from image data imaged by the imaging unit 102 is detected, a smiling face imaging process in which an instruction of the start of imaging is issued to the control unit 101 at the time when a detected face smiles, and the like, as the various types of control on image data.

The imaging mode control unit 111 is an example of an imaging control unit of the present disclosure, and controls imaging modes during imaging by the imaging device 100. Specifically, the imaging mode control unit 111 controls the self-timer mode when the imaging device 100 executes self-timer imaging.

In the present embodiment, the imaging mode control unit 111 has at least two self-timer modes as a mode in which the imaging device 100 executes self-timer imaging. One is a self-timer mode (first self-timer mode) in which the automatic focusing process is executed immediately after an imaging start instruction is received, and then imaging is executed after a predetermined time elapses from completion of the automatic focusing process. The other one is a self-timer mode (second self-timer mode) in which, after a predetermined time elapses from reception of an imaging start instruction, the automatic focusing process is executed, and then imaging is executed. To be more specific, the imaging device 100 according to the present embodiment of the present disclosure executes imaging control in the first self-timer mode and the second self-timer mode in which, after the imaging start instruction is received from a photographer, the automatic focusing process and the imaging process are executed in order. In addition, in the imaging device 100 according to the present embodiment of the present disclosure, a first period from the reception of the imaging start instruction to the performance of the automatic focusing process in the first self-timer mode is set to be shorter than a second period from the reception of the imaging start instruction to the performance of the automatic focusing process in the second self-timer mode. The imaging mode control unit 111 selects any one self-timer mode from the two self-timer modes when self-timer imaging is executed in the imaging device 100.

Note that the imaging device 100 may start an operation without starting the timer according to an imaging instruction from a photographer in both self-timer modes described above. In the first self-timer mode, the imaging device 100 may start an operation without starting the timer according to an imaging instruction from the photographer, and then start the timer after the completion of the automatic focusing process. In addition, in the second self-timer mode, after the automatic focusing process is executed by starting a timer of which time to the start of the automatic focusing process is set shorter than the time set by the self-timer, the imaging device 100 may execute an imaging process at the time when the time set by the self-timer has elapsed. Note that the imaging device 100 may use the same timer in the second self-timer mode. The imaging device 100 may control execution of the automatic focusing process and the imaging process in the second self-timer mode based on the clock of the same timer.

The imaging mode control unit 111 may select any one self-timer mode from at least two self-timer modes according to states of the imaging device 100 detected by the state detection unit 109. In description below, a case in which the state detection unit 109 detects pivoting states of the display unit 108, and the imaging mode control unit 111 selects any one self-timer mode from the two self-timer mode according to the pivoting states of the display unit 108 will be described.

Note that, in description below, the state in which the display plane of the display unit 108 is disposed on the back side of the imaging device 100 is referred to as a "general imaging mode", and the state in which the display plane of the display unit 108 is disposed on the front side of the imaging device 100 is referred to as a "self-shot mode,"

respectively. The "self-shot mode" is an imaging mode to image a photographer himself or herself while he or she views his or her own reflection displayed on the display unit 108 holding the imaging device 100. In addition, the "general imaging mode" is an imaging mode that is different from the "self-shot mode," and aims to execute general imaging using the imaging device 100 by the photographer.

Hereinabove, the functional configuration example of the imaging device 100 according to the present embodiment of the present disclosure has been described using FIG. 4. Next, an operation of the imaging device 100 according to the present embodiment of the present disclosure will be described.

[Operation Example of Imaging Device]

Figure 5:
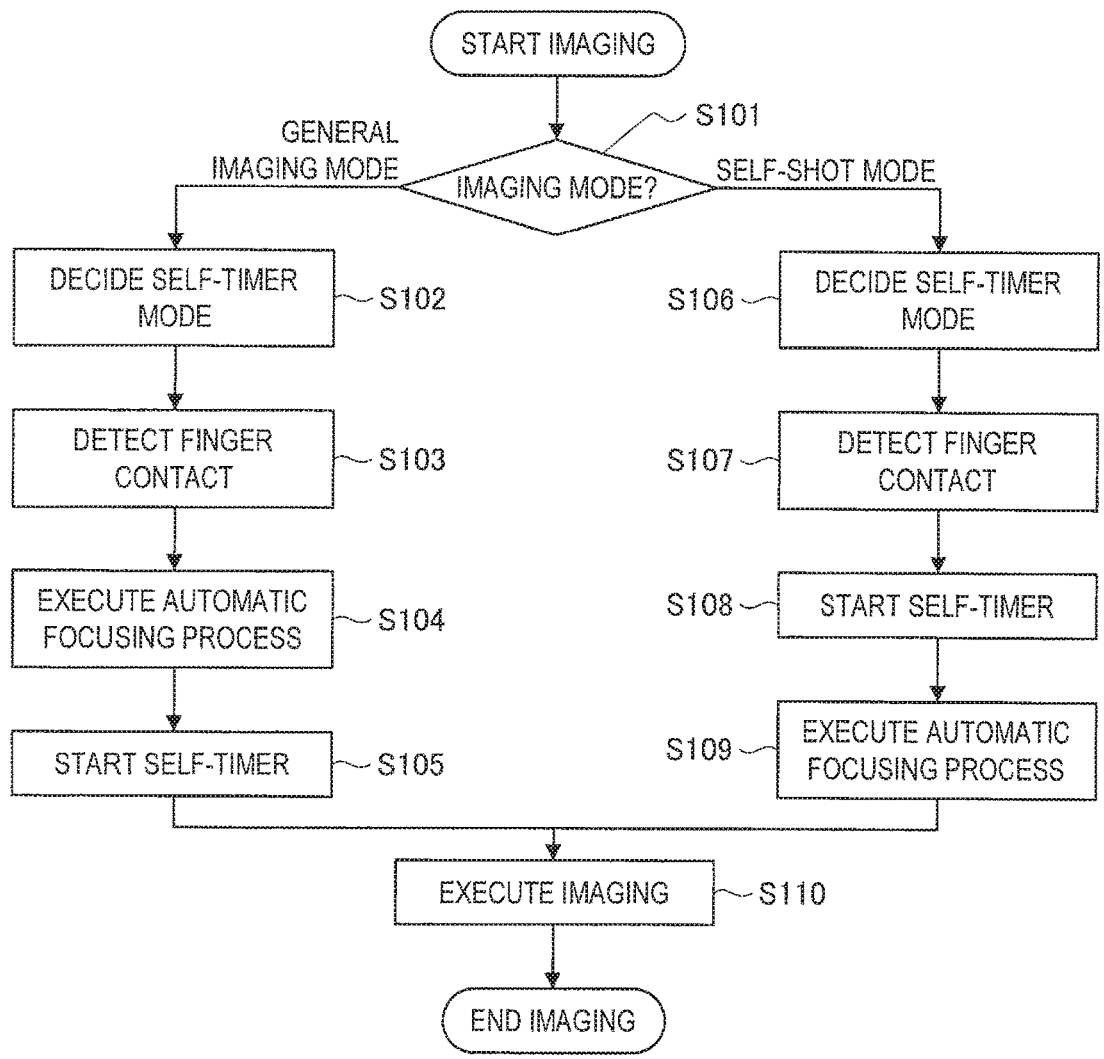
FIG. 5 is a flowchart showing an operation example of the imaging device 100 according to the embodiment of the present disclosure.

FIG. 5 is a flowchart showing an operation example of the imaging device 100 according to the embodiment of the present disclosure. The operation example shown in FIG. 5 is an operation example of the imaging device 100 according to the present embodiment of the present disclosure when self-timer imaging is executed in the imaging device 100. Hereinafter, the operation example of the imaging device 100 according to the present embodiment of the present disclosure will be described using FIG. 5.

When self-timer imaging is executed in the imaging device 100, the imaging device 100 first determines whether or not the imaging mode is a general imaging mode or a self-shot mode (Step S101). The determination of Step S101 is made by, for example, the imaging mode control unit 111.

As a result of the determination of Step S101, if the display plane of the display unit 108 is on the back side of the imaging device 100 and the imaging mode is determined to be the general imaging mode, the imaging device 100 then decides a self-timer mode in the general imaging mode (Step S102). The decision of Step S102 is made by, for example, the imaging mode control unit 111. If the imaging mode is a general imaging mode, the self-timer mode is the first self-timer mode in which the automatic focusing process is executed immediately after an imaging start instruction is received, then after a predetermined time elapses, imaging is executed. Note that executing imaging means acquiring still images to be recorded.

Next, the imaging device 100 awaits an imaging start operation by a user. Here, contact of the user's finger with the touch panel provided on the display unit 108 is exemplified as the imaging start operation by the user. When the imaging device 100 detects the contact of the user's finger with the touch panel provided on the display unit 108 (Step S103), the imaging device 100 first executes the automatic focusing process on a subject (S104). The detection of the contact of the user's finger with the touch panel provided on the display unit 108 is performed by, for example, the control unit 101, and according to the detection of the contact of the finger with the touch panel provided on the display unit 108, the control unit 101 executes the automatic focusing process on the subject. In addition, the automatic focusing process on the subject is executed by, for example, the control unit 101. There are various methods for performing the automatic focusing process on a subject, but there is a method, for example, in which the position of the focus lens is gradually shifted while computing a contrast value of an image, and then a position of the focus lens in which a maximum contrast value is obtained is set as a focus point.

When the automatic focusing process of the subject is executed, the imaging device 100 next starts the self-timer for executing imaging after a time set in advance (Step S105). Starting the self-timer is performed by, for example, the control unit 101.

On the other hand, as a result of the determination of Step S101, when the display plane of the display unit 108 is on the front side of the imaging device 100, and the imaging mode is determined to be the self-shot mode, the imaging device 100 next decides a self-timer mode in the self-shot mode (Step S106). The decision of the self-timer mode of Step S106 is made by, for example, the imaging mode control unit 111. If the imaging mode is the self-shot mode, the self-timer mode is the second self-timer mode in which, after a predetermined time elapses from reception of the imaging start instruction, the automatic focusing process is executed, and then imaging is executed.

Next, the imaging device 100 awaits an imaging start operation by a user. Here, contact of the user's finger with the display unit 108 is exemplified as the imaging start operation by the user. When the imaging device 100 detects the contact of the user's finger with the display unit 108 (Step S107), the imaging device 100 first starts the self-timer for executing imaging after a time set in advance (Step S108). The detection of the contact of the user's finger with the display unit 108 is performed by, for example, the control unit 101, and the control unit 101 starts the self-timer according to the detection of the contact of the finger with the display unit 108.

After a predetermined time elapses from the start of the self-timer, the imaging device 100 then executes the automatic focusing process on a subject (S109). The automatic focusing process on the subject is executed by, for example, the control unit 101 in the same manner as in Step S104 described above.

After the predetermined time elapses from the start of the self-timer in Step S105 in the general imaging mode, or after the automatic focusing process on the subject is executed in Step S109 in the self-shot mode, the imaging device 100 then executes an imaging operation to image the subject (Step S110). The execution of the imaging operation is performed by, for example, the control unit 101.

When the self-timer imaging is executed, the imaging device 100 selects one self-timer mode from the two self-timer modes by executing the operation as shown in FIG. 5. The imaging device 100 can appropriately execute the self-timer imaging avoiding an automatic focusing process that is not intended by the photograph, by selecting one self-timer mode from the two self-timer modes.

The imaging device 100 that executes the automatic focusing process immediately after the reception of the imaging start operation, and executes imaging after a predetermined time elapses from the execution of the automatic focusing process in the general imaging mode is on the premise that the subject should not move after focusing is performed appropriately for the subject in the imaging start operation by the photograph, as in imaging of a group photo, and thus, the focusing state does not change. After focusing is automatically performed on the subject in the imaging start operation, the imaging device 100 may only execute an imaging process after the time set by the self-timer elapses thereafter. Since the photographer who performed the imaging start operation on the imaging device 100 moves to the position of the subject before the time set by the self-timer elapses, the imaging device 100 can execute imaging focusing not only on the subject who has already been focused but also the photographer. In addition, since the imaging device 100 executes the automatic focusing process immediately after the reception of the imaging start operation, and executes imaging after the predetermined time elapses from the execution of the automatic focusing process in the general imaging mode, the photographer can move to the position in which he or she is photographed as a subject after operating the self-timer and then immediately confirming the result of the automatic focusing process. On the other hand, the reason for which the imaging device 100 sequentially executes processes of the automatic focusing process and the imaging process after the time set by the self-timer elapses after the reception of the imaging start operation in the self-shot mode is to appropriately focus on the subject during the elapse of the time set by the self-timer, not on the subject during the imaging start operation by the photographer. By automatically focusing on the subject during the elapse of the time set by the self-timer in the self-shot mode, the imaging device 100 can appropriately focus on the subject in an automatic manner, avoiding a focusing process that is not intended by the photographer.

In the present embodiment, the imaging device 100 first determines whether the imaging mode is the general imaging mode or the self-shot mode in Step S101, but the present disclosure is not limited to the example. For example, the imaging device 100 may determine whether or not imaging is performed in the self-timer mode based on the decision by the photographer to employ the general imaging mode or the self-shot mode. In addition, when the imaging device 100 images in the self-shot mode based on, for example, a state of the display unit 108, an instruction of the user, or the like, the device may be set to image reliably in the self-timer mode.

Figure 6:
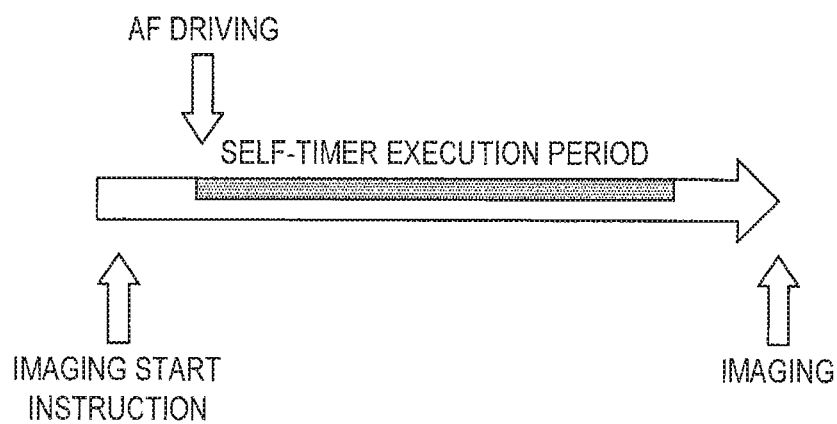
FIG. 6 is a descriptive diagram showing a self-timer mode provided in the imaging device 100.
Figure 7:
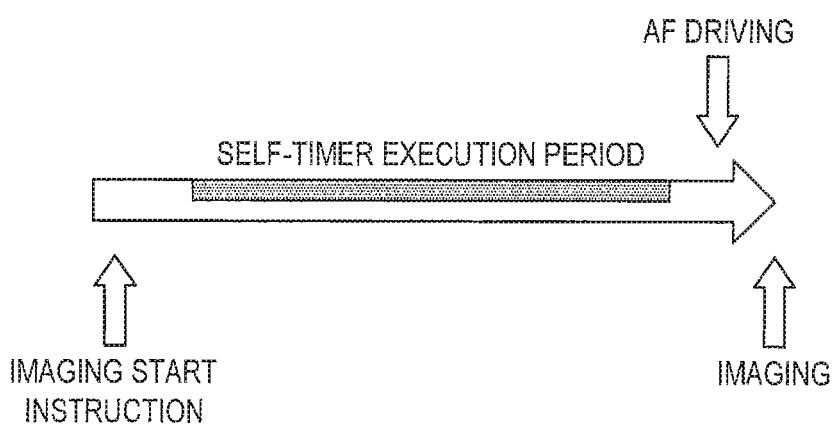
FIG. 7 is a descriptive diagram showing another self-timer mode provided in the imaging device 100.

FIGS. 6 and 7 are descriptive diagrams showing two self-timer modes provided in the imaging device 100 according to the embodiment of the present disclosure. FIG. 6 shows the first self-timer mode in which the imaging device 100 executes the automatic focusing process immediately after the reception of the imaging start instruction, and executes imaging after the predetermined time elapses from the execution of the automatic focusing process according to an operation of a photographer. FIG. 7 shows the second self-timer mode in which the imaging device 100 receives the imaging start instruction, executes the automatic focusing process after the predetermined time elapses from the reception, and then executes imaging according to an operation of a photographer.

The imaging device 100 according to the embodiment of the present disclosure selects one self-timer mode from the two self-timer modes according to an imaging mode. By selecting one self-timer mode from the two self-timer modes according to the imaging mode, self-timer imaging can be appropriately executed, avoiding an automatic focusing process that is not intended by a photographer.

<2. Conclusion>

As described above, the imaging device 100 according to the embodiment of the present disclosure has two self-timer modes in the time points of respective automatic focusing processes and starts of the self-timer are different during self-timer imaging. The imaging device 100 selects one self-timer mode from the two self-timer modes according to an imaging mode.

When, for example, the display plane of the display unit 108 is on the back side of the imaging device 100, and the imaging mode is determined to be in the general imaging mode, the imaging device 100 selects the self-timer mode in which the automatic focusing process is executed immediately after the reception of the imaging start instruction, and after the predetermined time elapses, imaging is executed. On the other hand, when the display plane of the display unit 108 is on the front side of the imaging device 100, and the imaging mode is determined to be the self-shot mode, the imaging device 100 selects the self-timer mode in which the automatic focusing process is executed after the predetermined time elapses from the reception of the imaging start instruction, and then imaging is executed.

In this manner, when an imaging operation is about to start with contact of a finger with the display unit 108, for example, as shown in FIG. 3, the imaging device 100 can appropriately execute self-timer imaging, avoiding an automatic focusing process that is not intended by a photographer, such as focusing on a finger or a hand of the photographer by selecting the self-timer mode according to the imaging mode.

It should be understood by those skilled in the art that various modifications, combinations, sub-combinations and alterations may occur depending on design requirements and other factors insofar as they are within the scope of the appended claims or the equivalents thereof.

In the above-described embodiment, for example, the imaging device 100 determines an imaging mode based on a pivoting state of the display unit 108, and a self-timer mode is selected based on the determination result, but the present disclosure is not limited thereto. For example, a self-timer mode may be selected based on a fixed state of the imaging device 100.

That the imaging device 100 is fixed means that imaging is performed with the imaging device 100 fixed to a tripod stand, or the like. Thus, if the imaging device 100 is fixed, the device is considered to perform general imaging and not self-shot, and thus, when the imaging device 100 is fixed, the imaging device 100 may select the self-timer mode in the general imaging mode in which the automatic focusing process is executed immediately after the reception of the imaging start instruction, and after the predetermined time elapses from the execution, imaging is executed.

On the other hand, if the imaging device 100 is not fixed, the device is considered to perform imaging while being held in a hand. When the imaging device 100 is not fixed, the imaging device 100 may select the self-timer mode in the self-shot mode in which, after the predetermined time elapses from the reception of the imaging start instruction, the automatic focusing process is executed, and then imaging is executed. Note that, even when the imaging device 100 performs imaging while being held in a hand, not performing the self-shot is of course considered, and thus, when the imaging device 200 is not fixed, the imaging device 100 may further determine an imaging mode based on a pivoting state of the display unit 108, and select a self-timer mode based on the determination result.

Note that the imaging device 100 may make a determination on whether or not the device should be fixed to a tripod stand, or the like based on a state of the imaging device 100 detected by the state detection unit 109. For example, when the imaging device 100 is detected not to be shaken for a predetermined time by a gyro sensor, an acceleration sensor, or the like, the imaging device 100 is determined to be fixed to a tripod stand, or the like, and may select the self-timer mode in the general imaging mode. Conversely, when the imaging device 100 is detected to be shaken by a gyro sensor, an acceleration sensor, or the like, the imaging device 100 is determined to be held in a hand, and may select the self-timer mode in the self-shot mode. In addition, the imaging device 100 may be provided with a light emitting unit such as a light emitting diode and a light detecting unit such as a photodetector, or the like, and the imaging device 100 may detect a fixed state to the tripod stand by detecting light from the light emitting diode reflected on a tripod camera stand.

In addition, in the above-described embodiment, the display unit 108 has been described as pivoting 180 degrees having the upper side of the housing of the imaging device 100 as a pivot, but the present disclosure is not limited thereto. For example, the display unit 108 may be attached to or detached from the housing of the imaging device 100, and switched to the state in which the display plane of the display unit 108 is on the back side of the imaging device 100, or to the state in which the display plane of the display unit 108 is on the front side of the imaging device 100 as shown in FIG. 1.

In addition, each step in a process executed by each unit of the present specification is not necessarily performed along the order described in a sequence diagram of a flowchart, for example, in a time series manner. Each of the steps in a process executed by each unit may be performed, for example, in an order different from the order described in the flowchart, or performed in parallel.

In addition, in hardware including a CPU, a ROM, RAM, and the like that is installed in each device, a computer program for exhibiting the same functions as those of each device can also be stored. In addition, a storage medium in which the computer program is stored can be provided. In addition, by configuring each functional block shown in the functional block diagram as hardware, a series of processes can be realized in hardware.

Additionally, the present technology may also be configured as below.

(1) An imaging device including:

an imaging control unit that executes imaging control in first and second self-timer modes in which an automatic focusing process and an imaging process are executed in order after reception of an imaging start instruction, wherein a first period from the reception of the imaging start instruction to execution of the automatic focusing process in the first self-timer mode is shorter than a second period from the reception of the imaging start instruction to execution of the automatic focusing process in the second self-timer mode.

(2) The imaging device according to (1), further including:

an operation unit that issues an instruction of start of imaging to the imaging control unit, wherein, when a user issues the instruction of start of imaging, the operation unit is provided in a position in which light incident on a lens disposed in a housing is blocked by the user's hand or arm operating the operation unit.

(3) The imaging device according to (2), wherein the operation unit is an image display unit provided with a touch panel.

(4) The imaging device according to (3), wherein the image display unit is capable of being switched to be in a first state in which a display plane appears on a front side of the housing on which the lens is provided, and a second state in which the display plane appears on a back side of the housing, and wherein, upon using the self-timer mode, the imaging control unit executes imaging control in one of the first self-timer mode and the second self-timer mode according to whether the image display unit is in the first state or the second state.

(5) The imaging device according to any one of (1) to (4), wherein, upon using the self-timer mode, the imaging control unit executes imaging control in one of the first self-timer mode and the second self-timer mode according to a fixed state of the imaging device at a time of the reception of the imaging start instruction.

(6) The imaging device according to any one of (1) to (5), wherein, upon using the self-timer mode, the imaging control unit executes imaging control in one of the first self-timer mode and the second self-timer mode according to whether the imaging device is held by a user at a time of the reception of the imaging start instruction.

(7) The imaging device according to any one of (1) to (6), wherein the second self-timer mode is a self-shot mode, and the first self-timer mode is an imaging mode other than the self-shot mode.

(8) A method of controlling an imaging device, the method including:

controlling imaging in first and second self-timer modes in which an automatic focusing process and an imaging process are executed in order after reception of an imaging start instruction, wherein a first period from the reception of the imaging start instruction to execution of the automatic focusing process in the first self-timer mode is shorter than a second period from the reception of the imaging start instruction to execution of the automatic focusing process in the second self-timer mode.

(9) A computer program for causing a computer to execute:

controlling imaging in first and second self-timer modes in which an automatic focusing process and an imaging process are executed in order after reception of an imaging start instruction, wherein a first period from the reception of the imaging start instruction to execution of the automatic focusing process in the first self-timer mode is shorter than a second period from the reception of the imaging start instruction to execution of the automatic focusing process in the second self-timer mode.

What is claimed is:

1. An imaging apparatus comprising:
a body including a hinge;
a display part configured to move around the hinge; and
a circuitry configured to:
   execute an automatic focusing process after an imaging instruction, and
   change an execution timing of the automatic focusing process between a first timing which is a time after a first period from the imaging instruction and a second timing which is a time after a second period from the imaging instruction based on a position of the display part,
   wherein the second period is longer than the first period, and
   wherein the position is a position in which the display part has moved 180 degrees from an initial position.

2. The imaging apparatus of claim 1, wherein the execution timing of the automatic focusing process is set to the first timing when the display part is in the initial position.

3. The imaging apparatus of claim 1, wherein the second timing is set when a self-timer mode is set.

4. The imaging apparatus of claim 1, wherein the circuitry is further configured to determine a period between the imaging instruction and an imaging process based on a pre-determined self-timer period.

5. The imaging apparatus of claim 4, wherein the pre-determined self-timer period is set by a user.

6. The imaging apparatus of claim 1, wherein the circuitry is further configured to perform an imaging operation, and wherein the imaging operation is operated by a user.

7. The imaging apparatus of claim 1, wherein the display part is a touch panel display.

8. An imaging apparatus comprising:
a body; and
a circuitry configured to:
   execute an automatic focusing process after an imaging instruction,
   determine a state of the body, and
   change an execution timing of the automatic focusing process between a first timing which is a time after a first period from the imaging instruction and a second timing which is a time after a second period from the imaging instruction based on the state of the body,
   wherein the second period is longer than the first period.

9. The imaging apparatus of claim 8, wherein, to determine the state of the body, the circuitry is further configured to determine whether the body has been shaken for a pre-determined time.

10. The imaging apparatus of claim 9, wherein, to change the execution timing of the automatic focusing process, the circuitry is further configured to select a self-timer mode in a general imaging mode in response to determining that the body has not been shaken for the pre-determined time.

11. The imaging apparatus of claim 10, wherein, to change the execution timing of the automatic focusing process, the circuitry is further configured to select the self-timer mode in a self-shot mode in response to determining that the body has been shaken for the pre-determined time.

12. The imaging apparatus of claim 11, wherein the second timing is set when the self-timer mode is set.

13. The imaging apparatus of claim 8, wherein the circuitry is further configured to determine a period between the imaging instruction and an imaging process based on a pre-determined self-timer period.

14. The imaging apparatus of claim 13, wherein the pre-determined self-timer period is set by a user.

15. The imaging apparatus of claim 8, wherein the circuitry is further configured to perform an imaging operation, and wherein the imaging operation is operated by a user.

16. An imaging method comprising:
executing, with an imaging apparatus, an automatic focusing process after an imaging instruction; and
changing an execution timing of the automatic focusing process between a first timing which is a time after a first period from the imaging instruction and a second timing which is a time after a second period from the imaging instruction based on a position of a display part of the imaging apparatus,
wherein the second period is longer than the first period, and
wherein the position is a position in which the display part has moved 180 degrees from an initial position.

17. The imaging method of claim 16, further comprising setting the execution timing of the automatic focusing process to the first timing when the display part is in the initial position.

18. The imaging method of claim 16, further comprising determining a period between the imaging instruction and an imaging process based on a pre-determined self-timer period.

19. The imaging method of claim 18, further comprising setting, by a user, the pre-determined self-timer period.

20. An imaging method comprising:
executing, with an imaging apparatus, an automatic focusing process after an imaging instruction;
determining, with a circuitry, a state of a body of the imaging apparatus; and
changing an execution timing of the automatic focusing process between a first timing which is a time after a first period from the imaging instruction and a second timing which is a time after a second period from the imaging instruction based on the state of the body,
wherein the second period is longer than the first period.

21. The imaging method of claim 20, wherein determining the state of the body further includes determining whether the body has been shaken for a pre-determined time.

* * * * *